US011402539B2

(12) United States Patent
Zhang et al.

(10) Patent No.: US 11,402,539 B2
(45) Date of Patent: Aug. 2, 2022

(54) VIRTUAL CORE GENERATION AND MODELING

(71) Applicant: Baker Hughes Oilfield Operations LLC, Houston, TX (US)

(72) Inventors: Hao Zhang, Houston, TX (US); Nora Patricia Alarcon, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 302 days.

(21) Appl. No.: 16/271,960

(22) Filed: Feb. 11, 2019

(65) Prior Publication Data
US 2020/0257017 A1   Aug. 13, 2020

(51) Int. Cl.
| | |
|---|---|
| *G01V 99/00* | (2009.01) |
| *G01V 11/00* | (2006.01) |
| *E21B 47/00* | (2012.01) |
| *E21B 25/10* | (2006.01) |
| *G06T 17/05* | (2011.01) |
| *E21B 49/00* | (2006.01) |
| *G01V 1/44* | (2006.01) |

(52) U.S. Cl.
CPC ............ *G01V 99/005* (2013.01); *E21B 25/10* (2013.01); *E21B 47/00* (2013.01); *E21B 49/00* (2013.01); *G01V 1/44* (2013.01); *G01V 11/00* (2013.01); *G01V 99/00* (2013.01); *G06T 17/05* (2013.01)

(58) Field of Classification Search
CPC .......... G01V 99/00; G01V 11/00; G01V 1/44; E21B 49/00; E21B 47/00; E21B 25/10; G06T 17/05
See application file for complete search history.

(56) References Cited

U.S. PATENT DOCUMENTS

| | | |
|---|---|---|
| 5,461,562 A | 10/1995 | Tabanou |
| 6,816,787 B2 | 11/2004 | Ramamoorthy |
| 6,950,748 B2 | 9/2005 | Liu |
| 7,133,779 B2 | 11/2006 | Tilke |

(Continued)

FOREIGN PATENT DOCUMENTS

WO    2016/130945    8/2016

OTHER PUBLICATIONS

Wang et al., Geostatistical Inverse Modeling for Super-Resolution Mapping of Continuous Spatial Processes, Remote Sensing of Environment, vol. 139, Dec. 2013, pp. 205-215) (Year: 2013).*

(Continued)

*Primary Examiner* — Daniel R Miller
*Assistant Examiner* — Christian T Bryant
(74) *Attorney, Agent, or Firm* — Hogan Lovells US LLP

(57) ABSTRACT

Embodiments include a method that includes extracting a low resolution formation property model and a high resolution formation property model from at least one log. The method also includes splitting the extracted low resolution formation property model into one or more property compositions. The method also includes generating a high resolution virtual core via the low resolution formation property model and at least a second high resolution formation property, the high resolution virtual core utilizing a moving window analysis to accommodate between different resolutions of the second high resolution formation property model and the low resolution property composition.

17 Claims, 10 Drawing Sheets

(56) References Cited

U.S. PATENT DOCUMENTS

| | | | |
|---|---|---|---|
| 7,526,413 B2 | 4/2009 | Dahlberg | |
| 8,725,477 B2 | 5/2014 | Zhang | |
| 2004/0204857 A1* | 10/2004 | Ramamoorthy | G01V 11/00 702/7 |
| 2007/0061079 A1 | 3/2007 | Hu | |
| 2007/0239359 A1 | 10/2007 | Stelting | |
| 2007/0246639 A1 | 10/2007 | Jacobi | |
| 2007/0260403 A1* | 11/2007 | Wood | G01V 11/00 702/11 |
| 2009/0105955 A1 | 4/2009 | Castillo | |
| 2009/0259446 A1 | 10/2009 | Zhang | |
| 2012/0084009 A1* | 4/2012 | Peyaud | G01V 5/06 702/7 |
| 2012/0272724 A1 | 11/2012 | Hollmann | |
| 2015/0088424 A1* | 3/2015 | Burlakov | G01V 1/40 702/6 |
| 2015/0142320 A1* | 5/2015 | Wu | G01V 3/30 702/11 |
| 2016/0025895 A1 | 1/2016 | Ziauddin | |
| 2016/0124116 A1* | 5/2016 | Souche | G01V 99/005 703/2 |
| 2016/0222766 A1* | 8/2016 | Rowan | E21B 41/00 |
| 2017/0032532 A1 | 2/2017 | Andersen | |
| 2017/0275982 A1 | 9/2017 | Peyaud | |
| 2018/0203151 A1* | 7/2018 | Kouchmeshky | G01V 3/26 |
| 2018/0225868 A1* | 8/2018 | Bize | E21B 47/00 |
| 2018/0252101 A1* | 9/2018 | Bartetzko | E21B 47/12 |

OTHER PUBLICATIONS

Hagen-Zanker, "A Computational Framework for Generalized Moving Windows and its Application to Landscape Pattern Analysis", International Journal of Applied Earth Observation and Geoinformation, vol. 44, Feb. 2016, pp. 205-216 (Year: 2016).*

Q. Zhang, "A novel geological interpretation methodology for deviation of formation lithology and mineralogy," 2016, SEG International Exposition and 86th Annual Meeting, pp. 1656-1660.

K. E. Dahlberg et al., "Comparing Log-Derived and Core-Derived Porosity and Mineralogy in Thinly Bedded Reservoirs: an Integrated Approach," SPWLA Twenty-Nineth Annual Logging Symposium, Jun. 5-8, 1988, pp. 1-18.

Jean-Baptiste Peyaud et al., "Improved Methodology for High-Resolution Bed Mineralogy from Wireline Logs," SPWLA 51st Annual Logging Symposium, Jun. 19-23, 2010, pp. 1-8.

Luz Rodriguez et al., "Quantitative and Comparative Evaluation of Mineralogy and TOC Analysis from Cores, Cuttings, and Logs in Vaca Muerta Unconventional Shale Play," 2015, Unconventional Resources Technology Conference, pp. 1-24.

International Search Report and Written Opinion dated Jun. 4, 2020 in corresponding PCT Application No. PCT/US2020/017217.

Sukop et al, "Lattice Boltzmann methods applied to large-scale three-dimensional virtual cores constructed from digital optical borehole images of the karst carbonate Biscayne aquifer in southeastern Florida," In: Water Resources Research. Oct. 16, 2014 (Oct. 16, 2014) Retrieved on Apr. 5, 2020 (Apr. 5, 2020) from https://agupubs.onlinelibrary.wiley.com/dol/full/10.1002/2014WR015465, entire document, 38 pages.

* cited by examiner

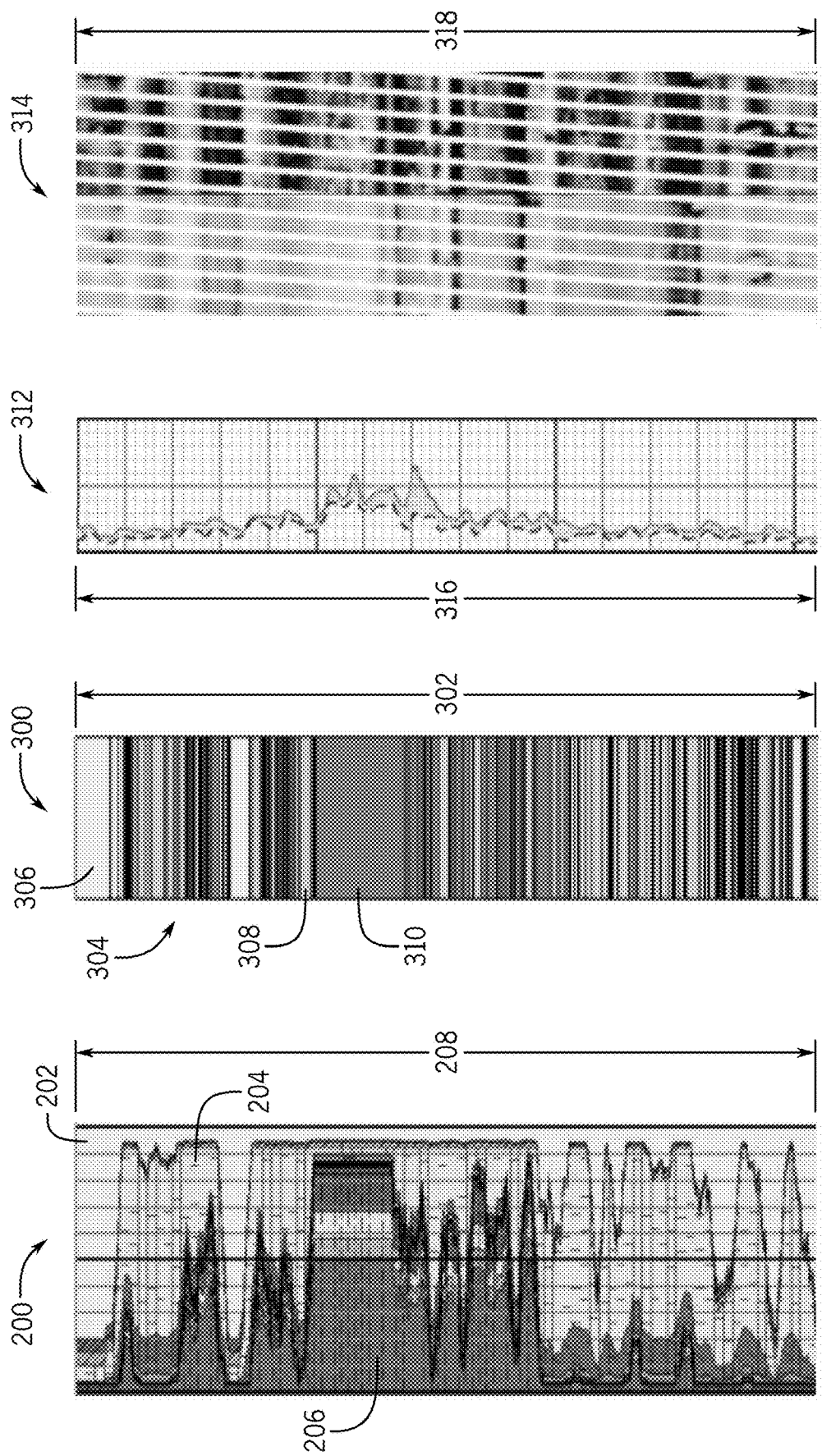

VIRTUAL CORE GENERATION AND MODELING

BACKGROUND

1. Field of the Invention

The present disclosure relates to downhole measurement systems. More specifically, this application relates to generating virtual borehole measurements using different downhole measurements.

2. Description of Related Art

Obtaining petrophysical models often involves the use of many specialized and/or expensive downhole operations. For example, core sampling may provide useful data related to a composition and structure of a wellbore, however, such sampling is expensive and may be difficult in certain formations. Moreover, core sampling may take long periods of time to evaluate, which may lead to non-productive time at a well site. Other high resolution (e.g., vertical resolution) and high-end logging tools may provide certain formation characteristics, but again suffer from the same drawbacks associated with cost. Moreover, in certain formation types, high-end logging tools may be unavailable or undesirable, such as formations where wellbores are too small to accommodate the tools. Additionally, certain high resolution images may only provide a limited amount of data, which may be insufficient to fully characterize a well.

SUMMARY

Applicant recognized the problems noted above herein and conceived and developed embodiments of systems and methods, according to the present disclosure, for determination of downhole formation properties.

In an embodiment, a computing system includes a device processor and a memory device. The memory device includes instructions that, when executed by the device processor, enable the computing system to retrieve one or more high resolution logs, the one or more high resolution logs corresponding to a wellbore formed in a formation. The instructions also enable the computing system to extract a high resolution lithology model and a low resolution lithology volumetric model from one or more high resolution logs. The instructions also enable the computing system to obtain a low resolution mineralogy log. The instructions also enable the computing system to split the low resolution lithology volumetric model and the low resolution mineralogy log into low resolution mineral compositions for one or more lithology types. The instructions also enable the computing system to generate a high resolution virtual core, the virtual core corresponding to a mineral composition of the wellbore.

In an embodiment, a computing system includes a computing device processor and a memory device. The memory device includes instructions that, when executed by the computing device processor, enable the computing system to extract a low resolution lithology volumetric model and a high resolution lithology model from at least one imaging log. The instructions also enable the computing system to split the extracted low resolution lithology volumetric model into one or more mineral compositions for one or more lithology types. The instructions also enable the computing system to generate a high resolution virtual core via the low resolution lithology volumetric model and at least one high resolution lithology model, the high resolution virtual core utilizing a moving window analysis to accommodate between different resolutions of the high resolution lithology model and the low resolution lithology volumetric model.

In an embodiment, a method includes extracting a low resolution formation property model and a high resolution formation property model from at least one log. The method also includes splitting the extracted low resolution formation property model into one or more property compositions. The method also includes generating a high resolution virtual core via the low resolution formation property model and at least a second high resolution formation property, the high resolution virtual core utilizing a moving window analysis to accommodate between different resolutions of the second high resolution formation property model and the low resolution property composition.

BRIEF DESCRIPTION OF DRAWINGS

The present technology will be better understood on reading the following detailed description of non-limiting embodiments thereof, and on examining the accompanying drawings, in which:

FIG. 2 is an illustration of an embodiment of a minerology characterization, in accordance with embodiments of the present disclosure;

FIGS. 3A-3C are illustrations of embodiments of high resolution log data, in accordance with embodiments of the present disclosure;

DETAILED DESCRIPTION

Figure 1:
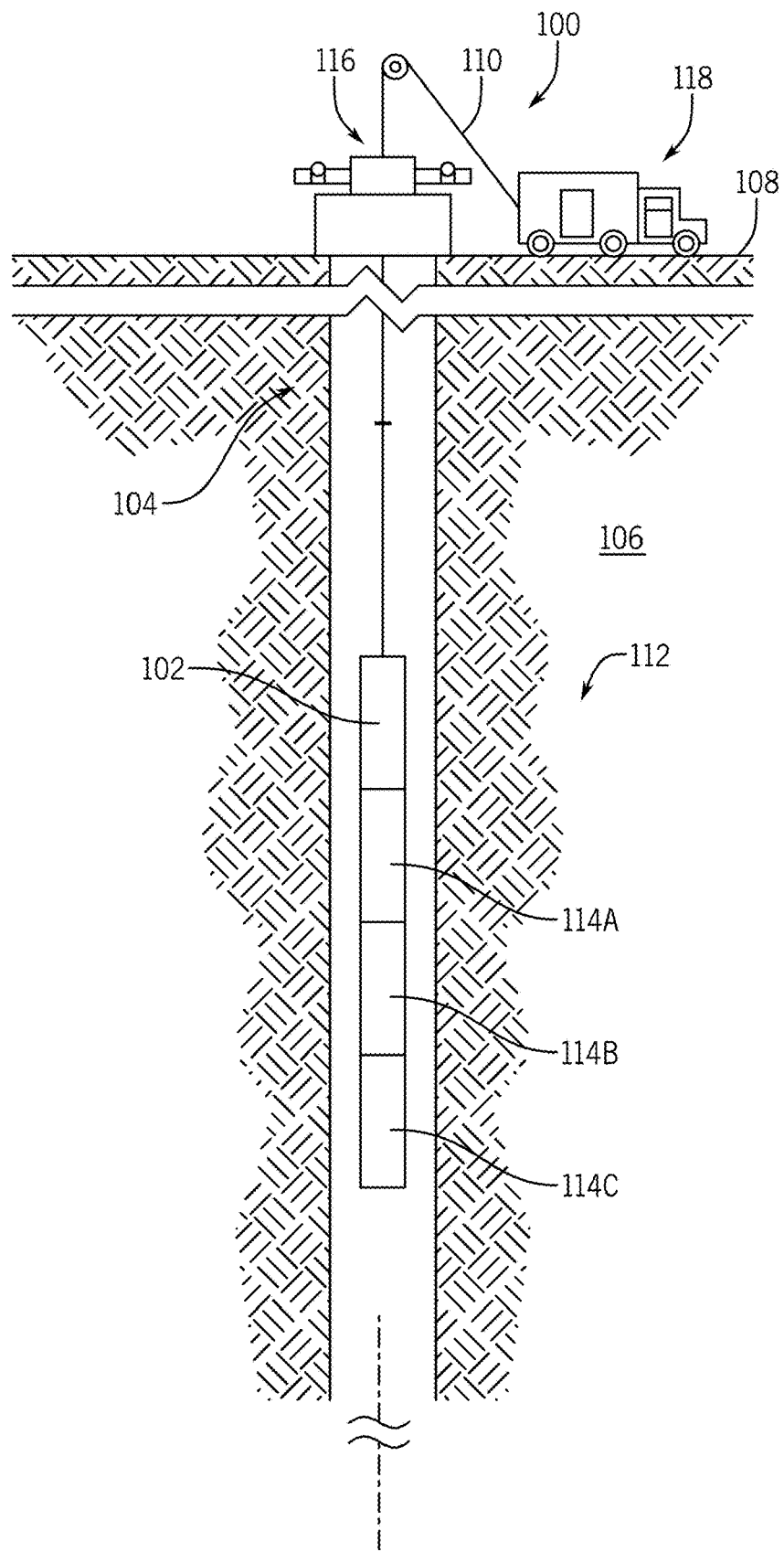
FIG. 1 is a schematic side view of an embodiment of a wireline system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed to solving for high-resolution mineralogical compositions of the formation. In various embodiments, a workflow may be developed including: 1) extracting lithology volumetric models from high resolution image logs combined with other conventional logs; 2) splitting the mineralogical compositions from lower-resolution geochemical logs into mineral compositions for various lithology types; 3) obtaining high-resolution mineral model; 4) performing quality check by comparing the computed results with core measurements or other input data. In certain embodiments, the inputs to obtain the high-resolution mineral model include a pulsed neutron spectroscopy tool derived mineralogical characterization of a formation (e.g., mineral weight fractions at the pulsed neutron tool resolution) and an image log or a combination of high resolution measurements, providing a high resolution lithological description of the formation— higher resolution than that of pulsed neutron spectroscopy data.

In various embodiments, the first step in the workflow uses a probabilistic approach to provide a petrophysical interpretation of a high resolution lithology description model consisting of various lithology types such as sand, shale, and carbonate. This approach delivers pseudo linear simultaneous solutions of formation lithology and their relative volumes using various logging responses and modeling input parameters. In various embodiments, the second step in the virtual core workflow is to split spectroscopy mineralogy into mineral compositions for various lithology types with lithology volumes. The lithology volumes may be obtained from the first step and may also utilize pulsed neutron tool mineralogy as an additional input. In the third step, mineral composition properties are assigned to high resolution lithology layers. Moreover, in various embodiments, virtual core compositions are computed at high resolution and high sampling rate. It should be appreciated that the third step may include moving windows due to the different resolutions and sampling rates of given lithology and high resolution lithology models. The final step in the virtual core workflow is to perform quality check by comparing resampled virtual core vs. pulsed neutron spectroscopy mineralogy and report relative error. In various embodiments, known core measurements may also be used to perform a quality check.

In an embodiment, a computing system includes a computing device processor and a memory device. The memory device includes instructions that, when executed by the computing device processor, enable the computing system to retrieve one or more high resolution logs, the one or more high resolution logs corresponding to a wellbore formed in a formation. The instructions also enable the computing system to extract both, a high and a low resolution lithology volumetric model. In various embodiments, the high-resolution lithology volumetric model is used to get a final high resolution mineralogy. The high resolution lithology model may be resampled to get a low resolution model to match the resolution of the mineralogy logs. The instructions also enable the computing system to obtain a low resolution mineralogy log. The instructions also enable the computing system to split the low resolution lithology volumetric model and the low resolution mineralogy log into low resolution lithology compositions. The instructions also enable the computing system to generate a high resolution virtual core, the virtual core corresponding to a mineral composition of the wellbore.

In an embodiment, a computing system includes a computing device processor and a memory device. The memory device includes instructions that, when executed by the computing device processor, enable the computing system to extract both a high resolution and a low resolution lithology volumetric model from at least one imaging log having a higher resolution. The instructions also enable the computing system to split the extracted low resolution lithology volumetric model into one or more lithology compositions. The instructions also enable the computing system to generate a high resolution virtual core via the low resolution lithology compositions and at least one high resolution lithology model, the high resolution virtual core utilizing a moving window analysis to accommodate between different resolutions of the high resolution lithology model and the low resolution lithology volumetric compositions.

In an embodiment, a method includes extracting both a high resolution and a low resolution lithology volumetric model from at least one imaging log having a higher resolution. The method also includes splitting the extracted low resolution lithology volumetric model into one or more lithology compositions. The method further includes generating a high resolution virtual core via the low resolution lithology volumetric compositions and at least one high resolution lithology model, the high resolution virtual core utilizing a moving window analysis to accommodate between different resolutions of the high resolution lithology model and the low resolution lithology volumetric compositions.

FIG. 1 is a schematic side view of an embodiment of a wellbore system 100 that includes a tool 102 (which may be part of a tool string) being lowered into a wellbore 104 formed in a formation 106 from a surface location 108. The illustrated wellbore system 100 may be referred to as a wireline system because the tool 102 is conveyed on a cable 110, such as an electric wireline although this system could also be deployed on a drill string for measurement while drilling. In various embodiments, the electric wireline may transmit electric signals and/or energy from the surface location 108 into the wellbore, for example to provide operational power for the tool 102 and/or to transmit data, such as data obtained from sensors arranged on the tool 102. In various embodiments, the tool 102 may be utilized to perform downhole logging operations, and may be an imaging tool, a resistivity tool, a nuclear tool, or any other logging tool that may be used in a downhole environment.

Moreover, in various embodiments, the tool 102 may include multiple logging or imaging tools therein. For simplicity, the all logging or imaging tools described herein will be described with reference to the tool 102. However, in various embodiments the logs or images obtained from the various tools may be obtained at different times using different tools 102.

As described above, in various embodiments the tool 102 may be part of a tool string 112, which may include various components utilized for wellbore operations. For example, the tool string 112 may include various other tools 114A-114C that may include sensors, measurement devices, communication devices, and the like, which will not all be described for clarity. In various embodiments, the tool string 112 may include one or more tools to enable at least one of a logging operation, a perforating operation, or a well intervention. For example, nuclear logging tools, fluid sampling tools, core sampling devices, and the like may be utilized in logging operations. Perforating operations may include ballistic devices being lowered into the wellbore to perforate casing or the formation. Furthermore, well interventions may include operations related to analyzing one or more features of the wellbore and proceeding with performing one or more tasks in response to those features, such as a data acquisition process, a cutting process, a cleaning process, and the like. Accordingly, in various embodiments, the tool string 112 may refer to tools that are lowered into the wellbore. Additionally, passive devices such as centralizers or stabilizers, tractors to facilitate movement of the tool string 112 and the like may also be incorporated into the tool string 112.

In various embodiments, different power and/or data conducting tools may be utilized by embodiments of the present disclosure in order to send and receive signals and/or electrical power. As will be described below, in various embodiments sensors may be incorporated into various components of the tool string 112 and may communicate with the surface or other tool string components, for example via communication through the cable 110, mud pulse telemetry, wireless communications, wired drill pipe, and the like. Furthermore, it should be appreciated that while various embodiments include a wireline system, in other embodiments rigid drill pipe, coiled tubing, or any other downhole exploration and production methods may be utilized with embodiments of the present disclosure.

The wellbore system 100 includes a wellhead assembly 116 shown at an opening of the wellbore 104 to provide pressure control of the wellbore and allow for passage of equipment into the wellbore 104, such as the cable 110 and the tool string 112. In this example, the cable 110 is a wireline being spooled from a service truck 118. The illustrated cable 110 extends down to the end of the tool string 112. In operation, the cable 110 may be provided with slack as the tool string 112 is lowered into the wellbore 104, for example to a predetermined depth. In various embodiments, a fluid may be delivered into the wellbore 104 to drive movement of the tool string 112, for example where gravity may not be sufficient, such as in a deviated wellbore. For example, a fluid pumping system (not illustrated) at the surface may pump a fluid from a source into the wellbore 104 via a supply line or conduit. To control the rate of travel of the downhole assembly, tension on the wireline 110 is controlled at a winch on the surface, which may be part of the service tuck 118. Thus, the combination of the fluid flow rate and the tension on the wireline may contribute to the travel rate or rate of penetration of the tool string 112 into the wellbore 104. The cable 110 may be an armored cable that includes conductors for supplying electrical energy (power) to downhole devices and communication links for providing two-way communication between the downhole tool and surface devices. Moreover, in various embodiments, tools such as tractors and the like may further be disposed along the tool string 112 to facilitate movement of the tool string 112 into the wellbore 104. Thereafter, in various embodiments, the tool string 112 may be retrieved from the wellbore 14 by reeling the cable 110 upwards via the service truck 118. In this manner, logging operations may be performed as the tool string 112 is brought to the surface 108.

FIG. 2 is an illustration of a mineralogy characterization 200 of a wellbore, in accordance with embodiments of the present disclosure. In various embodiments, the characterization 200 may be provided from one or more downhole logging operations, such as the BHGE Formation Lithology eXplorer™ (FLeX™) elemental spectroscopy wireline logging tool, a pulsed neutron spectroscopy tool, or any other tool that provides "low resolution" (LR) logging data. As used here, resolution refers to a vertical distance that the logging data corresponds to. Accordingly, "low resolution" may refer to tools that cover a few feet (e.g., approximately 2 feet), whereas "high resolution" (HR) may refer to tools that cover a few inches or a fraction of an inch (e.g., 0.1 inches). As such, the LR logging data may not be able to identify thin layers or small features in a formation, but rather, an average over a larger (comparatively) distance, such as approximately 1 foot. On the other hand, HR logging data may provide features in smaller scales, and as a result, provide dynamic information to facilitate reservoir evaluation and exploration. It should be appreciated that while various embodiments may be described with respect to lithology or mineralogy, that in other embodiments different formation properties may be evaluated such as porosity, permeability, and the like. Moreover, geomechanical properties may also be determined. Accordingly, while certain imaging techniques are described in detail herein, it should be appreciated that other formation evaluation techniques such as density logs, acoustic logs, and the like may also be utilized, as either high resolution or low resolution data. In the illustrated embodiment, mineralogical characterizations are provided by the different segmented areas, which represent a weight fraction of certain components within the log. For example, the area 202 may correspond to quartz, the area 204 may correspond to calcite, and the area 206 may correspond to clay material, such as illite. The characterization 200 is low resolution and includes a frame 208 representative of a section of the wellbore. In various embodiments, the areas 202, 204, 206 may represent an average composition of the wellbore over a range, such as approximately 2 feet, and as a result the characterization 200 may be referred to as LR. In certain embodiments, as will be described below, the characterization 200 may be broken down into different lithology compositions, which may facilitate improved characterization of the wellbore when evaluated against a HR log, as described by various embodiments of the present disclosure.

FIG. 3A is an illustration of a lithology characterization 300 of a wellbore, in accordance with embodiments of the present disclosure. The illustrated characterization 300 may be referred to as a HR characterization because information is provided over a small distance, for example less than 0.1 inches. The characterization 300 includes a frame 302 representative of a section of the wellbore. In various embodiments, the frame 302 may be equal to the frame 208. However, it should be appreciated that, in other embodiments, the frames 302 and 208 may be different. As noted above, the frames generally correlate to a section of the wellbore over which the measurements were taken. The illustrated characterization 300 includes various levels 304, corresponding to a dominating lithology type. For the same lithology type, the mineral composition can change along the depth. As a result, an area 306 may correspond to sand, but the composition may be different at various depths. The illustrated embodiment further includes an area 308 corresponding to carbonate, and an area 310 corresponding to shale.

FIGS. 3B and 3C are illustrations of a gamma ray log 312 and an image log 314. The image log 314 may be referred to as HR while the gamma log 312 is LR. Each includes a respective frame 316, 318, which represents a segment of wellbore. As noted above, the frames 316, 318 may be equal in various embodiments. The gamma ray log 312, for example, may be utilized to determine a composition of the formation including the wellbore. In certain embodiments, the gamma ray log 312 may measure naturally occurring gamma radiation in order to characterize the rock or sediment of the formation and may be utilized with the wireline operation illustrated in FIG. 1. FIG. 3C illustrates the image log 314, which produces the illustrated two-dimensional image of the borehole wall. The tools utilized to generate the image log 314 may be optical, acoustic, electrical, or the like. As will be described below, information from the gamma ray log 312 and the image log 314 may be utilized in order to determine various properties of the wellbore formation, and in various embodiments, may be combined with information from LR logs.

Figure 4:
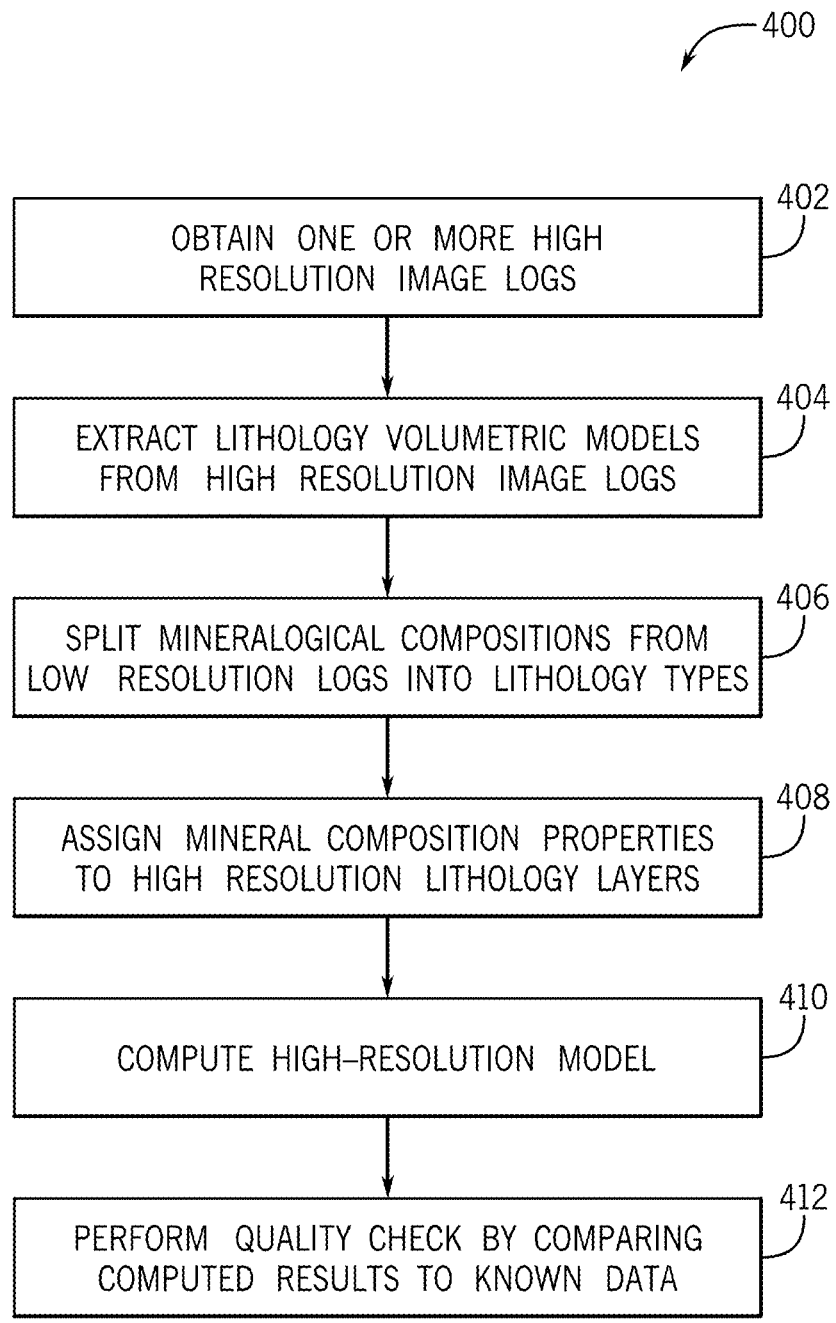
FIG. 4 is a flow chart of an embodiment of a method for generating a virtual core, in accordance with embodiments of the present disclosure.

FIG. 4 is a flow chart of a method 400 for developing a virtual borehole model. It should be appreciated that the steps of the method 400 may be performed in any order or in parallel, unless otherwise specifically stated. Furthermore, the method 400 may include more or fewer steps. In this example, one or more HR image logs are obtained 402. The image logs may be obtained from a data store and/or from real or near real-time acquisition at a well site. The image logs may be referred to as HR, as described above, due to the vertical extent that the logs capture. In various embodiments, lithology volumetric models are extracted from the HR image logs 404. As will be described below, extraction may include using a probabilistic approach to provide a petrophysical interpretation of a HR lithology description model consisting of various lithology types such as sand, shale, and carbonate. For example, an average reading for various compositions may be determined at various different levels of the HR image. These averages may be correlated to the thickness of the material, which may then be arranged within the lithography model.

In various embodiments, the method further includes splitting mineralogical compositions from LR logs into lithology types 406. For example, in embodiments, a moving window may be utilized to obtain granular information over a larger window of information with respect to the lithography models. In certain embodiments, the step 406 may include receiving an input corresponding to the extracted lithology volumetric model and also other LR geochemical logs. As will be described below, utilizing the moving window enables various variables to be calculated for without using an iterative or determinative approach. The moving window enables a solution to a system of equations would otherwise be unstable because the number of unknowns are larger than the number of equations, creating an underdetermined system. Furthermore, as will be described, various embodiments also utilize a reference model to guide the solution towards predefined lithology types.

Next, mineral composition properties are assigned to HR lithology layers 408. As will be described in detail below, the HR and LR images have different sampling rates, as well as resolution, and as a result a one-to-one correlation may not be available to assign composition properties. As described above, a moving window approach may be utilized in order to look at various volumes at both high and low resolutions. The HR images may then be correlated to the LR images to generate a composition and form a HR model 410. Thereafter, the model may be compared to a known or similar composition to verify accuracy 412. In this manner, the combination of HR and LR logs may be utilized to generate the virtual borehole. It should be appreciated that this approach enables the use of various LR logs, which may be easier to obtain, when compared to the HR logs.

Figure 5:
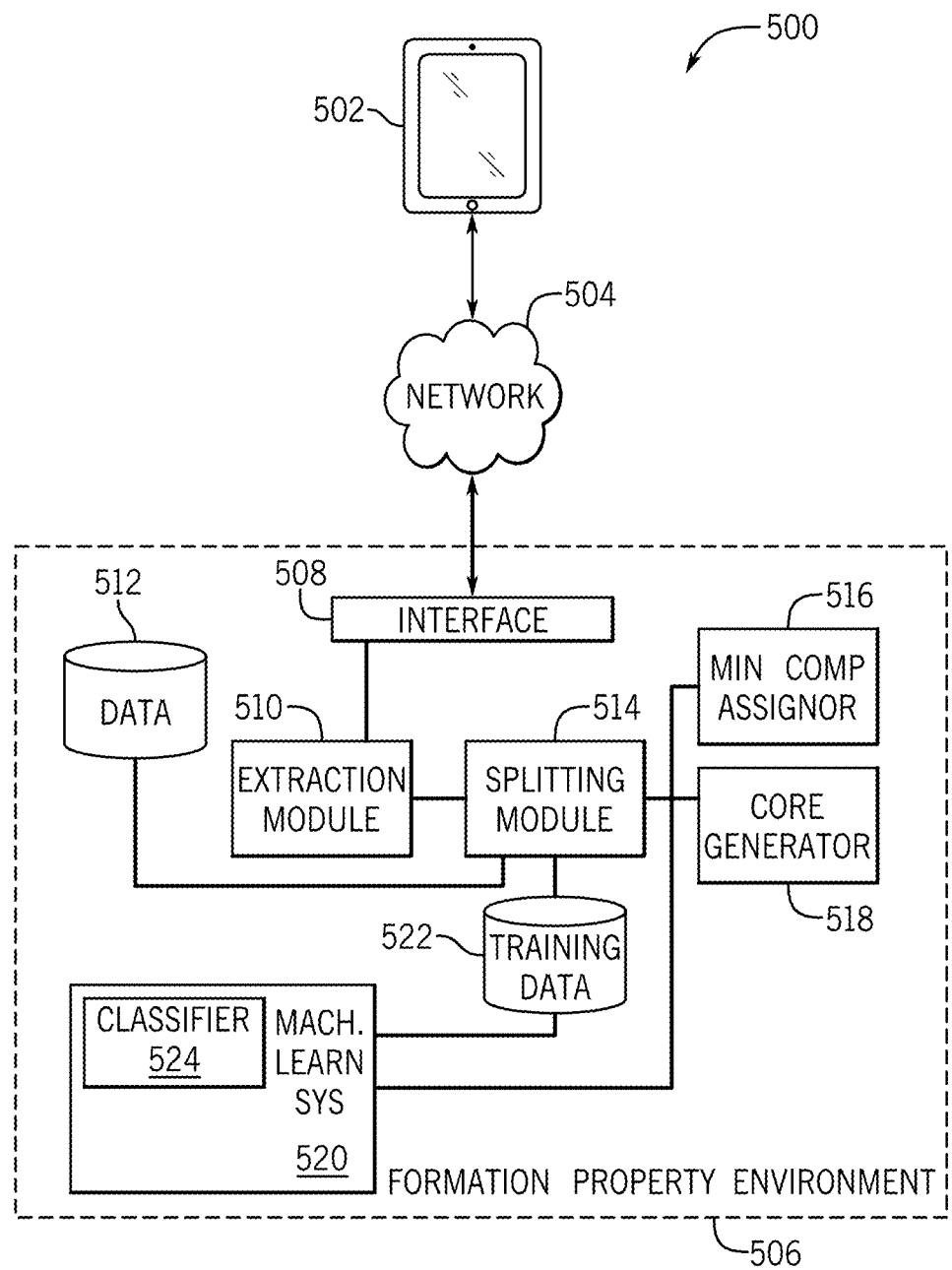
FIG. 5 is a schematic diagram of an embodiment of an environment that may be utilized with embodiments of the present disclosure.

FIG. 5 is a schematic diagram of an environment 500 in which various aspects of various embodiments of the present disclosure can be implemented. In this example, a computing device 502 is able to make a call or request across one or more networks 504 to a formation property environment 506 that includes a system that may be utilized to generate a virtual borehole using a combination of HR and LR logs. The network(s) can include any appropriate network, such as the Internet, a local area network (LAN), a cellular network, an Ethernet, or other such wired and/or wireless network. The formation property environment 506 can include any appropriate resources for evaluating information from the computing device 502, and may include various servers, data stores, and other such components known or used for providing content from across a network (or from the "cloud"). Individual computing devices 502 may be any of a wide variety of computing devices, including personal computing devices, terminal computing devices, laptop computing devices, tablet computing devices, mobile devices (e.g., smartphones), and various other electronic devices and appliances.

In this example, the computing device 502 may submit wellbore data captured by one or more tools 102. For example, the computing device 502 may transmit information from a logging tool of the tool string 112, which may include a HR or LR log. The wellbore data may be received at, for example, a network interface layer 508. The network interface layer can include any appropriate elements known or used to receive requests from across a network, such as may include one or more application programming interfaces (APIs) or other such interfaces for receiving such requests. The network interface layer 508 might be owned and operated by the service provider, or leveraged by the service provider as part of a shared resource or "cloud" offering. The network interface layer can receive and analyze the data from the computing device, and cause at least a portion of the information in the data to be directed to an appropriate system or service of the system.

For example, in various embodiments, the data may be transmitted to an extraction module 510. The extraction module 510 may be utilized to extract lithology volumetric model data from HR imaging logs, as described above. However, as described above, other types of data models may also be utilized that enable determination of permeability, porosity, and the like. In various embodiments, the HR logs may be transmitted from the computing device 502. However, in other embodiments, the data may be obtained from a data store 512, or a combination thereof. For example, the extraction module 510 may receive information from both the computing device 502 and the data store 512. The information may enable the extraction module to form the lithology volumetric model from a variety of HR logs, which may provide improved analysis and subsequent results.

The illustrated environment 506 also includes a splitting module 514. As described above, the splitting module 514 may be utilized to split lithology compositions into their component parts. For example, the lithology compositions may include components for shale, carbonate, and sand. The splitting module 514 may generate independent lithology compositions for each component, in various embodiments. The illustrated splitting module 514 may receive information from the extraction module 510, for example the extracted lithology volumetric model, as well as additional information from the data store 512.

In various embodiments, the environment 506 further includes a mineral component assignor 516. As described above, in various embodiments mineral components may be assigned to the split lithographic models, for example, using a moving window system that is weighted based on the information from the HR and LR logs. Each moving window may comprise different lithology mineral compositions. In embodiments, taking the average composition from all the corresponding moving windows and then assigning it to the thin layer may enable assignment with high confidence. The illustrated environment 506 further includes a core generator 518. The core generator 518 may be utilized to compile the virtual core, for example, from the assigned mineral components from the mineral component assignor 516.

In various embodiments, information utilized by the environment 506 may be used to train a machine learning system 520, which may be used to analyze one or more components of the system. In various embodiments, the machine learning system 520 can include a neural network such as a convolutional neural network (CNN).

A neural network is one example of potential machine learning systems 520 which may be utilized with embodiments of the present disclosure. Furthermore, various types of activation functions may be used, such as but not limited to a rectified linear unit (ReLU) model with a nonlinear activation. In some embodiments, neural network models may be linear or nonlinear, and may include a deep learning model or a single hidden layer. Other types of machine learning models may be used, such as decision tree models, associated rule models, neural networks including deep neural networks, inductive learning models, support vector machines, clustering models, regression models, Bayesian networks, genetic models, various other supervise or unsupervised machine learning techniques, among others. The model may include various other types of models, including various deterministic, nondeterministic, and probabilistic models.

For example, convolutional neural networks are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. Convolutional neural networks exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer.

The illustrated environment includes a training database 522, which may be utilized to provide information to the machine learning system 520. In this manner, certain types of log data may be recognized and classified by the machine learning system 520. For example, the training database 522 may include previously obtained information that correlated core samples with HR and LR logs. That is, core samples that were extracted from a formation and evaluated, for example in a lab, and then associated with logging information obtained proximate the location where the core samples were removed may be used as information to enable the machine learning system to correlate log data to generate virtual boreholes.

In various embodiments, the machine learning system 520 may be utilized for classification via a classifier module 524. The classifier module 524 may be trained to identify certain parameters of formations, for example, based on their high or LR log information.

Figure 6:
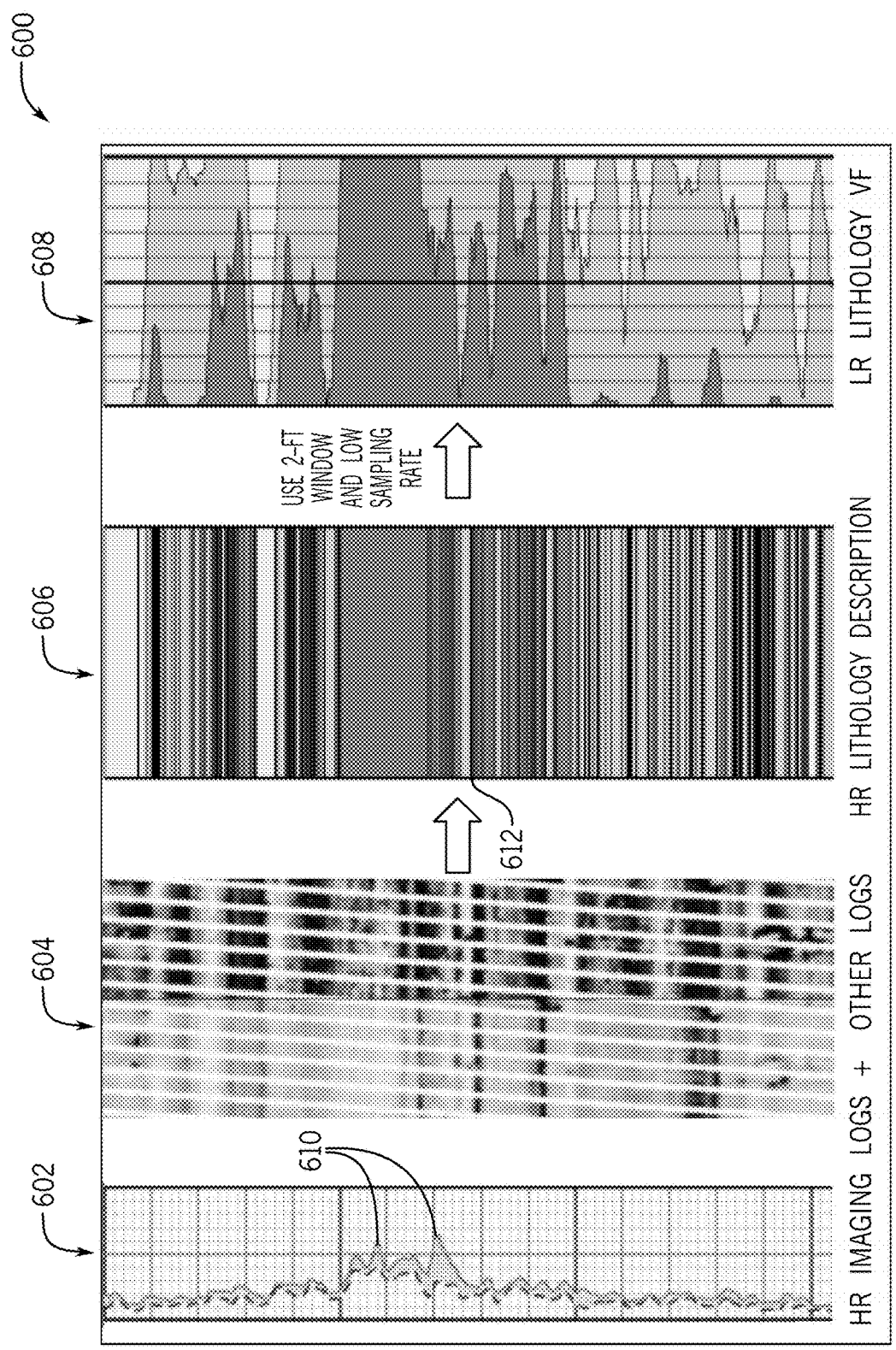
FIG. 6 is a graphical representation of a lithology extraction process, in accordance with embodiments of the present disclosure.

FIG. 6 is a graphical representation of the extraction process 600 described above, where HR imaging logs are utilized to generate HR lithology descriptions and LR lithology models. For example, the illustrated embodiment includes a LR gamma ray log 602, a HR imaging log 604, a HR lithology description 606, and a LR lithology model 608. Information from the HR imaging log 604 may be utilized to generate the HR lithology description 606. For example, in various embodiments, peaks 610 in the LR gamma ray log 602 may be evaluated with reference to the HR imaging log 604 to determine a corresponding area 612 in the HR lithology description 606.

The illustrated embodiment includes the LR lithology model 608, which may be obtained by evaluating the HR lithology description 606 using a window, such as a 2 foot window, as well as a low sampling rate. Accordingly, more detail may be obtained regarding certain portions of the formation. For example, in the illustrated embodiment, various portions of the HR lithology description 606 appear to be entirely formulated by a single component, such as being entirely sand or shale. However, when evaluated using the windows to obtain the LR lithology model 608, it can be seen that while certain components may form a high percentage of the areas, other components are also present.

Figure 7:
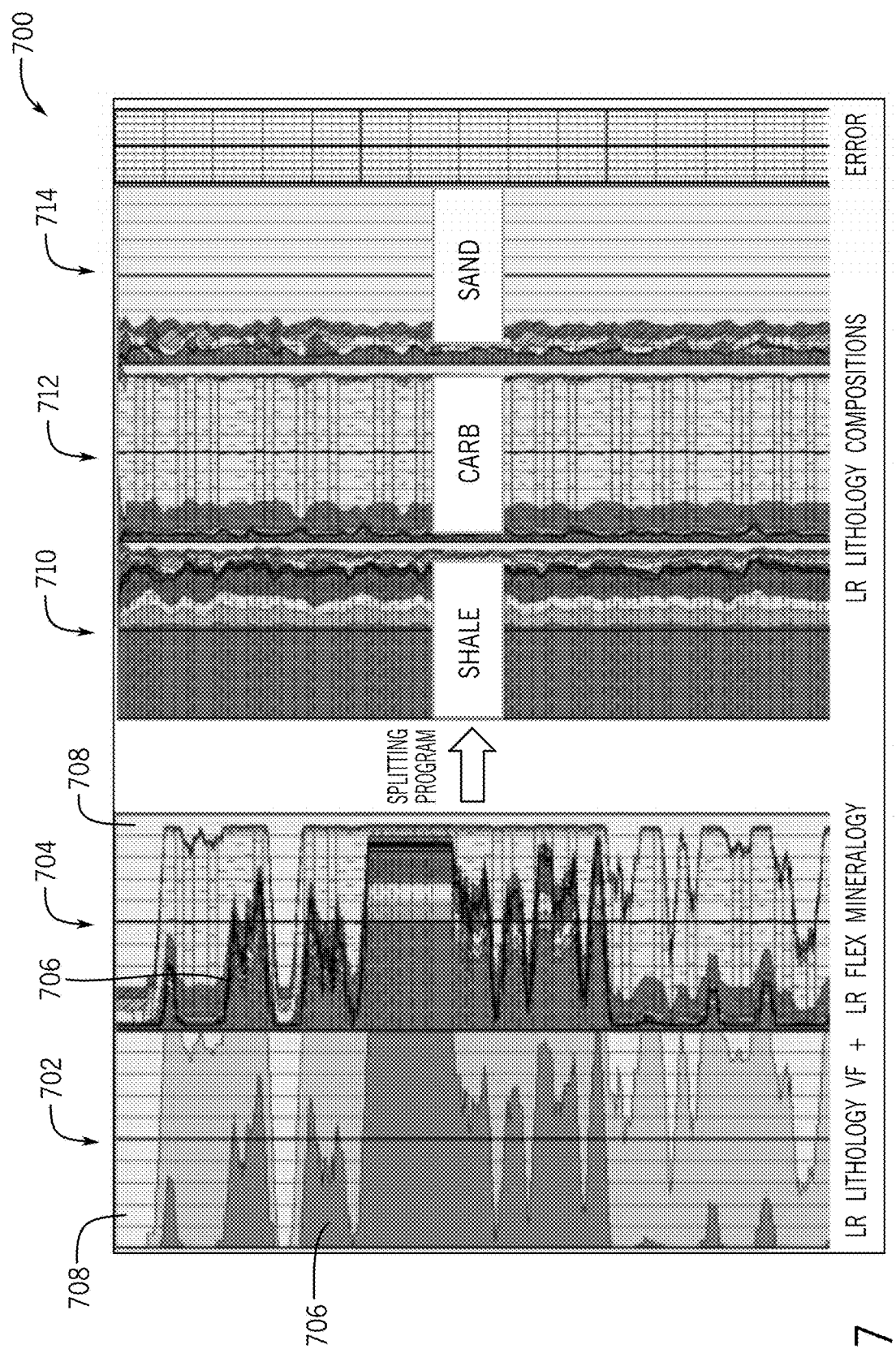
FIG. 7 is a graphical representation of a lithology composition splitting process, in accordance with embodiments of the present disclosure.

FIG. 7 is a graphical representation 700 of a LR lithology model 702 (which may be the model generated from FIG. 6) along with a LR mineralogy model 704. In the illustrated embodiment, certain features of each of the models 702, 704 correspond to one another. For example, areas of high shale content 706 are generally aligned, along with areas of high sand concentration 708. As such, the models may be utilized to split into different lithological compositions, such as a composition 710, a composition 712, and a composition 714. It should be appreciated that each composition 710, 712, 714 may have a different or varying composition for each lithology type.

As described above, in various methods a moving window method may be utilized to evaluate the models 702, 704 in order to split the mineral compositions. In various embodiments, a weight fraction mineralogical composition at a specific depth may be obtained via the mineralogy model 704, and may be represented as $$Wm_i, i=1,2,\ldots, M \qquad (1)$$

where M represents the number of minerals. Moreover, a volume fraction lithological composition of the formation at specific depth level as seen by the high resolution measurements, within a volume of investigation may be represented as $$Vl_j, j=1, \ldots, L \quad (2)$$

where L represents the number of lithologies. Accordingly, the weight and volume fractions may be normalized to one.

$$\sum_{i=1}^{M} Wm_i = 1; \quad (3)$$

$$\sum_{j=1}^{M} Vl_j = 1 \quad (4)$$

Accordingly, mineralogy of each lithology, at each depth level, within a volume of investigation may be characterized using estimated weight fractions, which may be represented as $$wm_{ij}, i=1,2, \ldots M; j=1,2, \ldots, L \quad (5)$$

and also satisfy the following condition $$\Sigma_{j=1}^{L} wm_{ij} Vl_j = Wm_i; i=1,2, \ldots, M \quad (6)$$

It should be appreciated that, in various embodiments, for each mineral, the sum of its weight fractions in each lithology, weighted by the corresponding volumetric fractions, add up to the LR mineralogy model 704. Such an arrangement would traditionally establish an undetermined system of equations, where the number of variables exceeds the number of equations to solve for the variables. However, embodiments of the present disclosure overcome this problem by utilizing a moving window over multiple depths, as well as optional references models, which may be utilized to define the system. Accordingly, the system of equations may be expressed as $$W\vec{Vl}=\vec{W}m \quad (7)$$

where W represents a matrix of dimension (M×L) describing the mineralogy of each lithology, and at each depth, over the logging volume of investigation; $\vec{Vl}$ represents a vector of length L, describing the volumetric proportion of lithologies, at each depth, over the logging volume of investigation; and $\vec{W}m$ represents a vector of length M, describing the mineralogy of the formation, at each depth, over the logging volume of investigation. The system can be applied at K depths where at each depth level, a number of levels around the depth level is considered, thereby generating a redundant system of equations, which may be transposed and solved, for example via the Least Squares Method.

The solutions obtained via Least Squares Method are independent, and therefore the system may be rewritten to enable simultaneous solutions for each lithology at each depth level (i.e. the central depth level of the K selected). As a result, the system may be expressed as $$\begin{bmatrix} A \\ U \\ R \end{bmatrix} [\vec{w}m] = \begin{bmatrix} \vec{W}m \\ \vec{U}v \\ \vec{wm}_o \end{bmatrix} \quad (8)$$

where $\vec{w}m$ represents vector of unknowns; A represents a matrix of lithology volumetrics; U represents a matrix for weight fraction constraints; R represents a reference model; $\vec{W}m$ represents a vector of rock mineralogy, for example from the LR mineralogy model 404; $\vec{U}v$ represents a unit vector for weight constraints; and $\vec{wm}_o$ represents a reference model matrix. Solving the equation enables stabilization of the system by utilizing data in a moving window of multiple depths. The illustrated shale composition 710, carbonate composition 712, and sand composition 714 may be generated using the equations described above. Advantageously, the solution may be processed quickly, for example thousands of feet may be processed in a few seconds.

Figure 8:
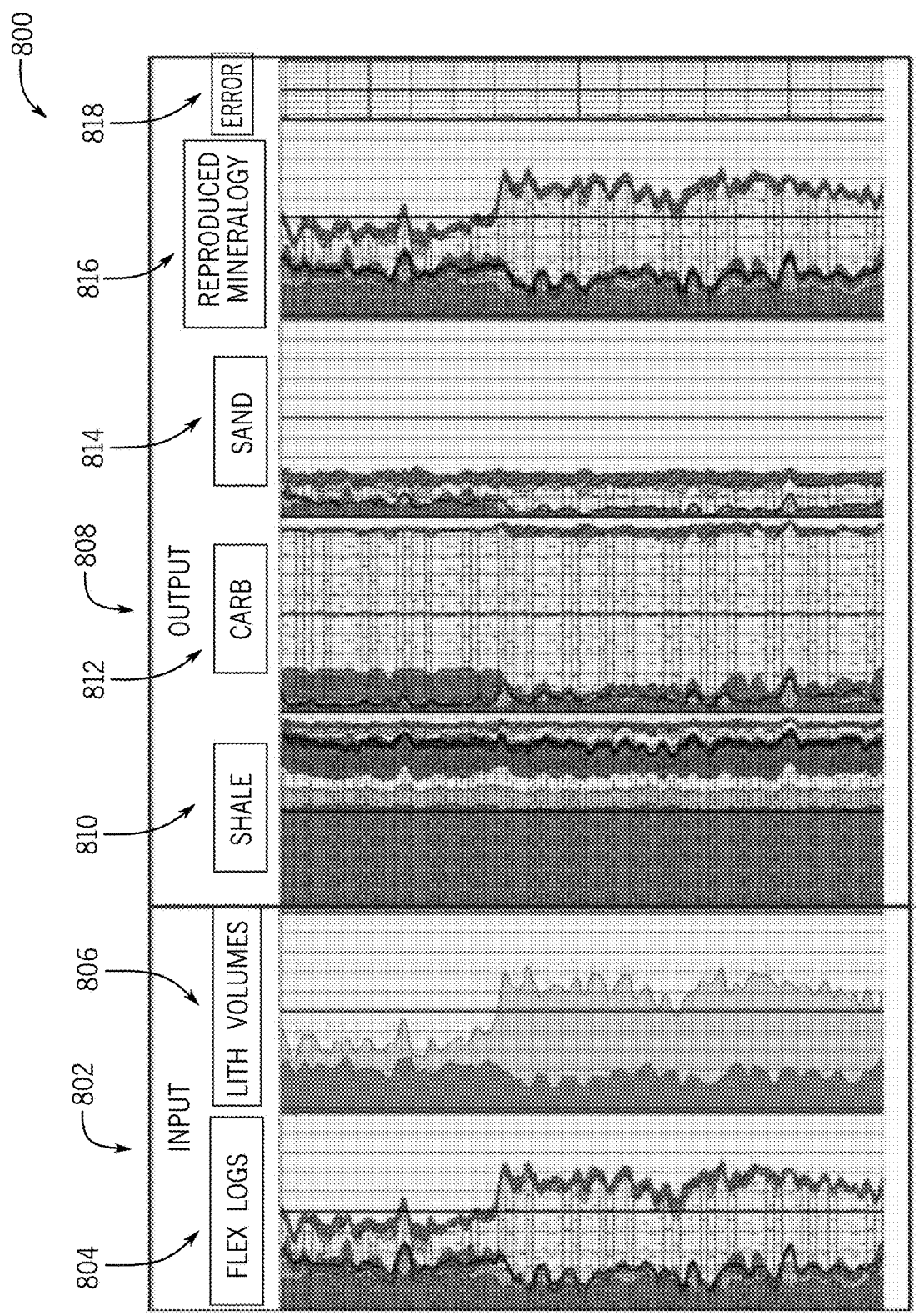
FIG. 8 is a graphical representation of a lithology composition splitting process and the reproduced mineralogy logs, in accordance with embodiments of the present disclosure.

FIG. 8 is a graphical illustration of a split composition flow 800. The split composition flow 800 illustrates inputs 802 corresponding to a mineralogy model 804 and a lithography model 806. In various embodiments, as described above, the inputs 802 are low resolution and may be obtained utilizing a variety of different logging tools. In embodiments, the splitting module described above may produce an output 808 including various different compositions, such as shale 810, carbonate 812, and sand 814. In certain embodiments, the mineralogy may be reproduced 816 and compared against an error 818 to verify the splitting into different component portions. In this manner, low resolution input may be split into different component parts for later evaluation for generating a virtual borehole or core.

Figure 9:
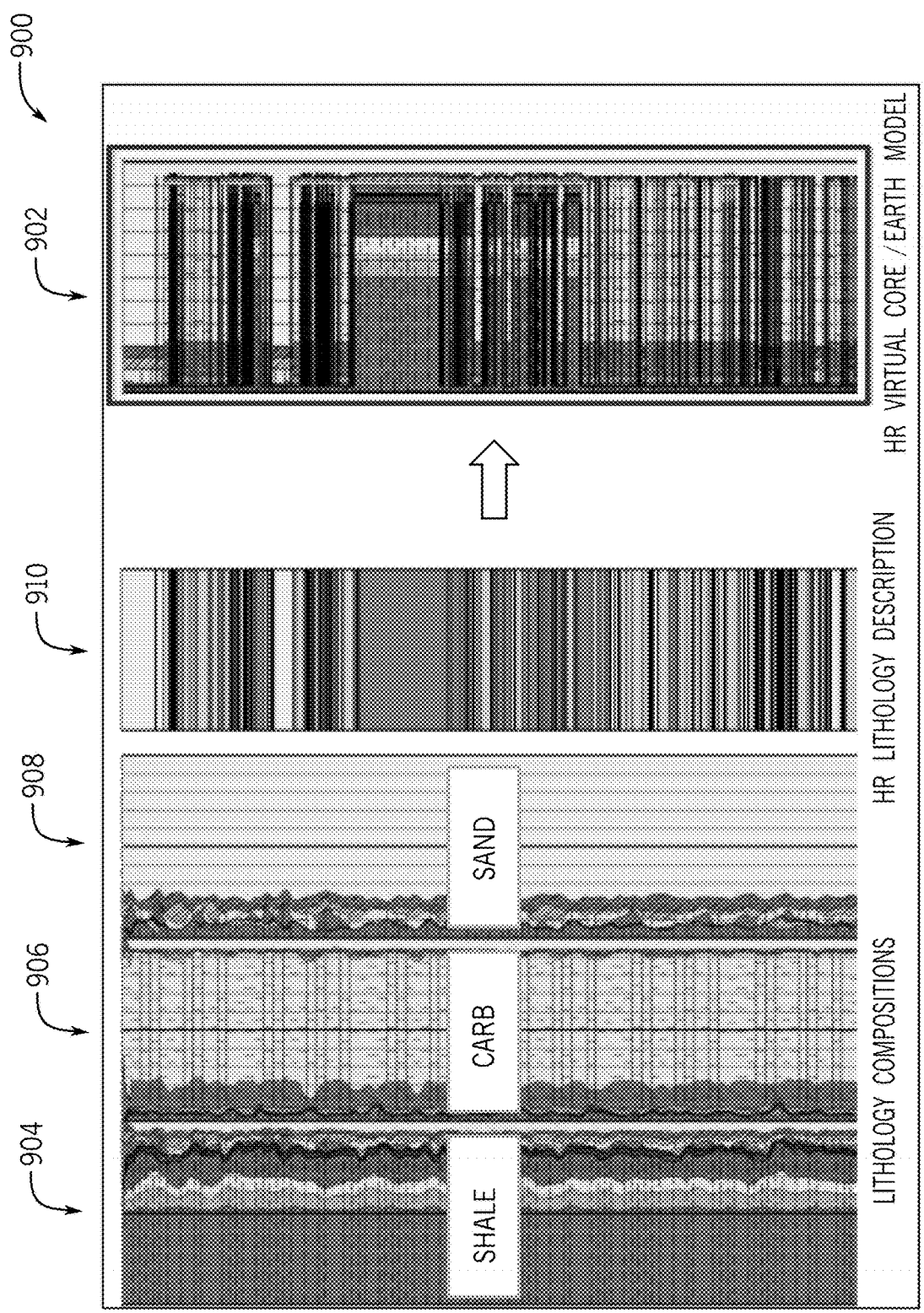
FIG. 9 is a graphical representation of a virtual core generation process, in accordance with embodiments of the present disclosure.
Figure 10:
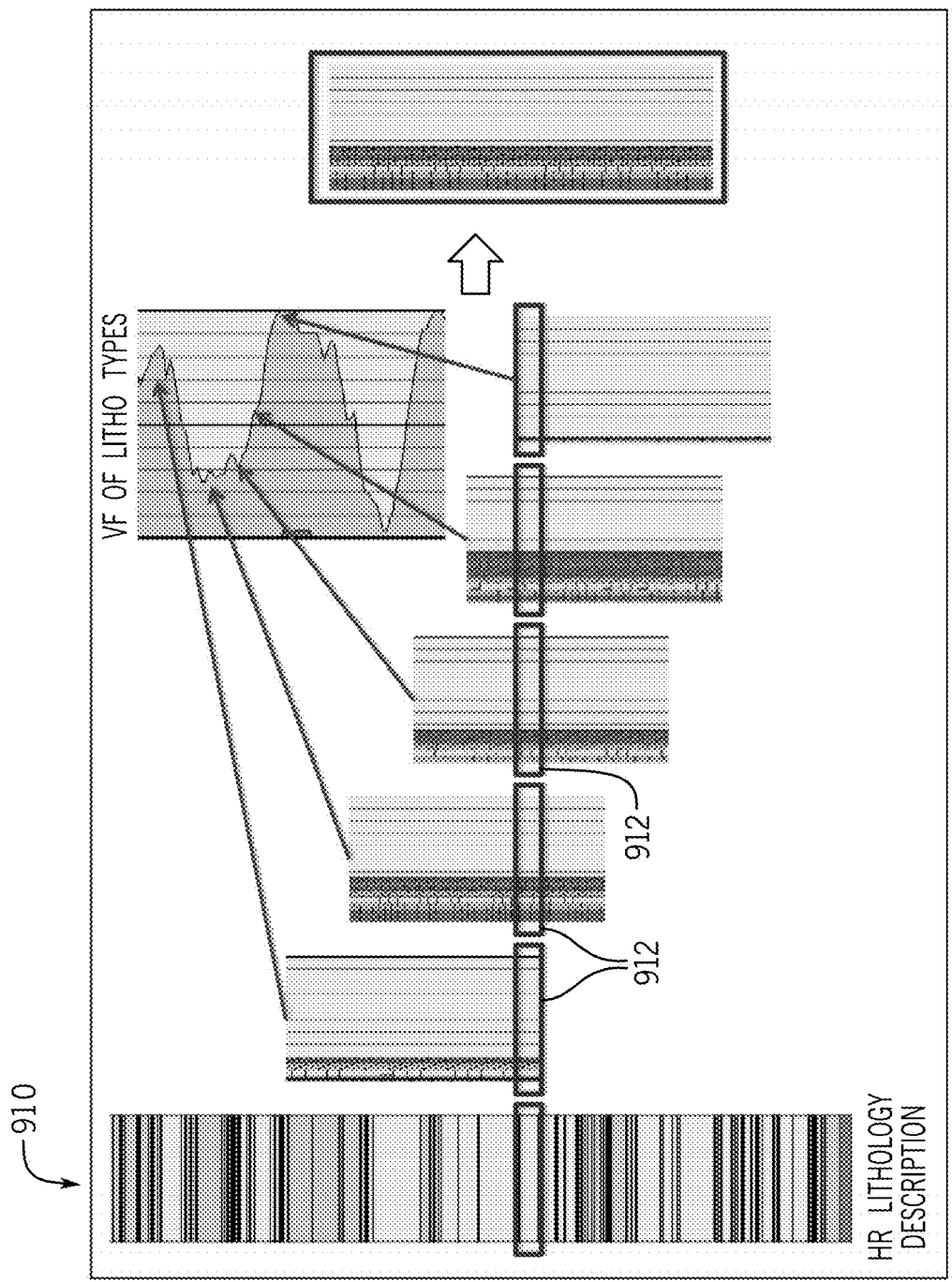
FIG. 10 is a graphical representation of a virtual core generation process using a moving window analysis, in accordance with embodiments of the present disclosure.

FIGS. 9 and 10 are graphical illustrations of a virtual core generation process 900. As described above, in various embodiments a virtual core 902 is generated by assigning mineral composition properties into HR lithology layers and computing a virtual core composition at HR and high sampling rate. In the illustrated embodiments, a shale component 904, a carbonate component 906, and a sand component 908 are utilized as input, along with a HR lithology description 910.

As noted above, the shale component 904, carbonate component 906, and sand component 908 are generated as LR lithology compositions, and as a result, cannot be directly assigned to the HR lithology description 910 due to the different vertical resolutions and sampling rates. However, as illustrated in FIG. 10, multiple moving windows 912 may be utilized to evaluate thin layers of the HR Lithology description 910. In the illustrated embodiment, each moving window 912 comprises different lithology mineral compositions, and as a result, the average composition from all corresponding moving windows may be assigned to a thin layer. However, it should be appreciated that, in various embodiments, at least some of the moving windows may have a higher confidence for their given compositions, and as a result, those compositions should be given a higher weight. In various embodiments, the confidence for each composition may be directly linked to volume fractions. Accordingly, a weighting function, based on lithology volumes, may be incorporated to determine an alignment between the thin layers evaluated in the windows 910 and a lithology model. Thereafter, the HR lithology description 910 may be combined with the lithology compositions to generate the HR virtual core 902. The virtual core 902 describes the mineral compositions in image log resolution, but does so by utilizing low resolution data.

Figure 11:
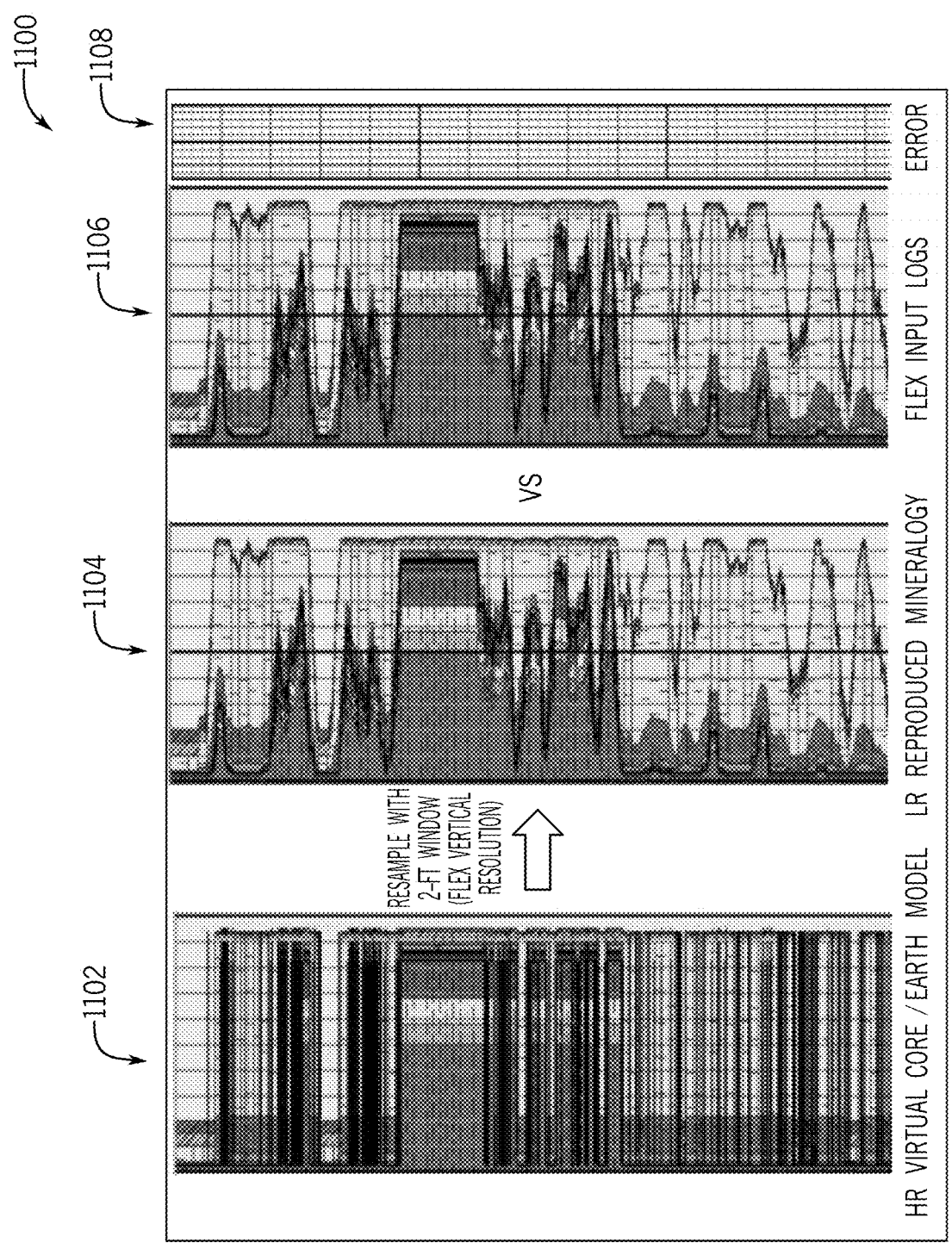
FIG. 11 is a graphical representation of a verification process, in accordance with embodiments of the present disclosure.

FIG. 11 is a graphical illustration 1100 of a quality check that may be performed after calculation of the virtual core. In the illustrated embodiment, a virtual core 1102 is resampled to be converted from a HR model to a LR model 1104. This low resolution model 1104 may then be compared to the original input LR minerology model 1106 and evaluated for error 1108. The quality check enables verification of the system. Moreover, in embodiments, the data may also be compared against core samples for further verification.

It should be appreciated that different information and data logs may also be incorporated. For example, permeability may be determined by evaluating various data logs, such as density logs, acoustic logs, and the like. Moreover, certain lithology or mineralogical compositions may be associated with correlated with particular formation properties. Accordingly, embodiments of the present disclosure are not limited to mineralogical and lithology evaluation, extraction, and combination. But rather, a variety of data logs may be used in order to determine various types of formation properties or geomechanical properties.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A computing system, comprising:
a device processor;
a memory device including instructions that, when executed by the device processor, cause the computing system to:
retrieve one or more high resolution logs, the one or more high resolution logs corresponding to a wellbore formed in a formation;
extract a high resolution lithology model and a low resolution lithology model from the one or more high resolution logs;
obtain a low resolution mineralogy log;
split the low resolution lithology model and the low resolution mineralogy log into low resolution mineral models for one or more lithology types; and
generate, based at least in part on the high resolution lithology model and the low resolution mineral models, a high resolution virtual core, the high resolution virtual core corresponding to a high resolution mineral model of the wellbore.

2. The computing system of claim 1, wherein the instructions, when executed further enable the computing system to:
split the low resolution mineral models for the one or more lithology types using a moving window approach.

3. The computing system of claim 1, wherein the instructions, when executed further enable the computing system to:
compare the high resolution virtual core to a core sample;
determine an error between the high resolution virtual core and the core sample; and
save the high resolution virtual core when the error is below a threshold level.

4. The computing system of claim 1, wherein the instructions, when executed further enable the computing system to:
calculate high resolution lithology models based at least in part on the low resolution mineral models and the low resolution lithology model; and
assign the high resolution lithology models to a high resolution lithology layer.

5. A computing system, comprising:
a computing device processor;
a memory device including instructions that, when executed by the computing device processor, enable the computing system to:
extract a low resolution lithology model and a high resolution lithology model from one or more high resolution imaging logs;
split the extracted low resolution lithology model into one or more mineral models for one or more lithology types; and
generate a high resolution virtual core via the extracted low resolution lithology model and the extracted high resolution lithology model, the high resolution virtual core utilizing a moving window analysis to accommodate between different resolutions of the extracted high resolution lithology model and the extracted low resolution lithology model.

6. The computing system of claim 5, wherein the instructions, when executed further enable the computing system to:
obtain a low resolution mineralogy log before splitting the extracted low resolution lithology model;
align features of the extracted low resolution lithology model to the low resolution mineralogy log; and
assign mineralogical models to the one or more lithology types.

7. The computing system of claim 5, wherein the high resolution lithology model has a smaller vertical range than the low resolution lithology model.

8. The computing system of claim 5, wherein the instructions, when executed further enable the computing system to:
determine an average composition of a layer of the one or more high resolution imaging logs; and
correlate the average composition of the layer to a thickness of the layer to determine a model of a lithology of the layer.

9. The computing system of claim 5, wherein the instructions, when executed further enable the computing system to:
determine a confidence for a lithology volume, based at least in part on a volume directed to a certain lithographic material; and
apply a weighting function, based on the confidence, to the moving window analysis.

10. The computing system of claim 5, wherein the instructions, when executed further enable the computing system to:
compare the high resolution virtual core to a core sample;
determine an error between the high resolution virtual core and the core sample; and
save the high resolution virtual core when the error is below a threshold level.

11. The computing system of claim 5, wherein the moving window analysis extends over a range corresponding to the vertical resolution for the extracted low resolution lithology model.

12. The computing system of claim 5, wherein the moving window analysis corresponds to multiple data points represented in the extracted high resolution lithology model or the extracted low resolution lithology model.

13. A method, comprising:
extracting a low resolution formation property model and a high resolution formation property model from at least one high resolution log;
splitting the extracted low resolution formation property model into one or more property models;
generating a high resolution virtual core via the extracted low resolution formation property model and additional high resolution formation properties, the high resolution virtual core utilizing a moving window analysis to accommodate between different resolutions in input data.

14. The method of claim 13, further comprising:
obtaining a low resolution mineralogy log and a high resolution lithology model before splitting the extracted low resolution formation property model;
aligning features of the extracted low resolution formation property model to the low resolution mineralogy log; and
assigning mineralogical models to one or more lithology types.

15. The method of claim 13, further comprising:
retrieving high resolution imaging logs.

16. The method of claim 13, wherein at least one of the low resolution formation property model and the high resolution formation property model is a lithology model, further comprising:
determining a confidence for a lithology type, based at least in part on a concentration volume directed to a certain lithographic material; and
applying a weighting function, based on the confidence, to the moving window analysis.

17. The method of claim 13, further comprising:
comparing the high resolution virtual core to a core sample;
determining an error between the high resolution virtual core and the core sample; and
saving the high resolution virtual core when the error is below a threshold level.

* * * * *